US 8,522,212 B1

(12) United States Patent
Bhatnagar

(10) Patent No.: US 8,522,212 B1
(45) Date of Patent: Aug. 27, 2013

(54) AUTO GENERATION OF TEST UTILITY BOTS USING COMPILE TIME HEURISTICS OF USER INTERFACE SOURCE CODE

(75) Inventor: Karan Bhatnagar, Hyderabad (IN)

(73) Assignee: Google Inc., Mountain View, CA (US)

( * ) Notice: Subject to any disclaimer, the term of this patent is extended or adjusted under 35 U.S.C. 154(b) by 445 days.

(21) Appl. No.: 12/840,326

(22) Filed: Jul. 21, 2010

(51) Int. Cl.
*G06F 9/44* (2006.01)

(52) U.S. Cl.
USPC ............ 717/125; 717/104; 717/109; 717/113

(58) Field of Classification Search
None
See application file for complete search history.

(56) References Cited

U.S. PATENT DOCUMENTS

| | | | | |
|---|---|---|---|---|
| 7,657,557 | B2* | 2/2010 | Super et al. | 717/109 |
| 7,856,619 | B2* | 12/2010 | He et al. | 717/109 |
| 8,104,020 | B2* | 1/2012 | Sharma et al. | 717/125 |
| 8,271,952 | B2* | 9/2012 | Jain et al. | 717/125 |
| 8,296,722 | B2* | 10/2012 | Yoshihama et al. | 717/104 |
| 8,392,886 | B2* | 3/2013 | Sweis et al. | 717/125 |
| 2006/0230319 | A1* | 10/2006 | Ryali et al. | 714/38 |
| 2009/0178029 | A1* | 7/2009 | Akeel et al. | 717/125 |
| 2010/0031234 | A1* | 2/2010 | Chaar et al. | 717/113 |
| 2010/0175055 | A1* | 7/2010 | Wang et al. | 717/137 |
| 2011/0225567 | A1* | 9/2011 | Livny et al. | 717/125 |

OTHER PUBLICATIONS

Luna et al., A flexible tool suite for change-aware test-driven development of web applications, May 2010, 2 pages.*
Orso et al., Improving test case generation for web applications using automated interface discovery, Sep. 2007, 10 pages.*

* cited by examiner

*Primary Examiner* — Thuy Dao
(74) *Attorney, Agent, or Firm* — Birch, Stewart, Kolasch & Birch, LLP

(57) ABSTRACT

Methods and apparatus, including computer program products, implementing and using techniques for generating one or more test utility classes for use in testing a web application user interface (UI). Source code for the UI is provided. The source code includes one or more UI elements. The source code is compiled to generate UI elements to be rendered on the UI. The compiling includes invoking a test utility class generator framework and passing a UI object tree that includes the UI elements to the test utility class generator framework. The test utility class framework analyzes the UI object tree to identify a set of basic UI elements on the rendered UI and to compute an extensible markup language path for each UI element in the hypertext markup language rendered for the UI. Based on the analysis, test utility classes are generated for use in testing the UI.

20 Claims, 3 Drawing Sheets

AUTO GENERATION OF TEST UTILITY BOTS USING COMPILE TIME HEURISTICS OF USER INTERFACE SOURCE CODE

BACKGROUND

The subject matter herein relates to testing of web applications. Web applications are computer software applications that are accessed through a web browser over a network, such as the Internet or an intranet. Web applications can also refer to computer software applications that are hosted in a browser-controlled environment (such as a Java™ applet) or coded in a browser-supported language (such as JavaScript™, combined with a browser-rendered markup language like HTML (HyperText Markup Language)) and reliant on a conventional web browser to render the application executable. Web applications are popular due to the ubiquity of web browsers and the convenience of using a web browser as a client. Web applications can be updated and maintained without distributing and installing software on potentially thousands of client computers. Web applications also have inherent support for cross-platform compatibility, which is another reason for their popularity. Some common web applications include webmail, online retail sales, online auctions, wikis, and so on.

Before making a web application accessible over the network, it is important to test the web application to ensure that it functions properly. A common way to do this is to use "bots," which are test utility classes. A test invokes the application programming interface (API) of the bots, which allow the bots to simulate user actions. The tests and bots together form a total web application verification system. The programming code used by the bots for each user interface (UI) must be written manually by programmers, based on the XPaths (XML Paths) of elements, such as buttons, form fields, etc.

A problem with this approach is that whenever the underlying code for a web application changes, for example, when the user interface changes and certain buttons, login boxes, etc. are added, removed, or moved to different parts of a web page, this changes the XPaths, and thus causes the web application tests to fail. As a result, the existing bots can no longer perform the necessary tests and the bot code must be rewritten based on the changed interface. This requires a significant amount of time and programming resources and becomes a tedious issue for the programmers. Also, significant portions of code are rewritten by software developers instead of being reused when testing other, similar, web applications.

SUMMARY

In general, in one aspect, the various implementations provide methods and apparatus, including computer program products, for generating one or more test utility classes for use in testing a user interface of a web application. Source code for the web application user interface is provided. The source code includes one or more user interface elements. The source code is compiled to generate user interface elements to be rendered on the user interface. The compiling includes invoking a test utility class generator framework and passing a user interface object tree that includes the one or more user interface elements to the test utility class generator framework. The test utility class framework analyzes the user interface object tree to identify a set of basic user interface elements on the rendered user interface and to compute an extensible markup language path for each user interface element in the hypertext markup language rendered for the user interface. Based on the analysis, one or more test utility classes are generated for use in testing the rendered user interface.

Implementations can include one or more of the following features. The generated test utility classes can be used in one or more functional tests of the rendered user interface. The source code can include user interface source templates and user interface source classes. Compiling the source code can include compiling the user interface source templates, and a static analysis of the user interface source classes can be performed to capture class properties of the user interface source classes. The class properties can include member fields with associated type-information. Generating one or more test utility classes can include using shared test utility classes from one or more libraries of basic test utility classes to construct the one or more test utility classes for use in testing the rendered user interface. The test utility classes in the libraries of basic test utility classes can contain information about a relative extensible markup language path rendering of each user interface element in the rendered user interface. The web application user interface code can be written in the JAVA™ programming language. Compiling can include adding an identifier attribute to each user interface element to be rendered on the user interface. The test utility class framework can compute relative extensible markup language paths for the one or more user interface elements in the user interface object tree.

Various implementations can include one or more of the following advantages. The need to manually program and maintain bots is eliminated by auto-generating the bot code from within the UI compiler at compile time. Furthermore, code sharing across teams is enabled, which further reduces duplicate programming efforts. Since the UI elements' object tree is accessed within the compiler during compilation, it is possible to add an identifier (ID) attribute to each of the various HTML elements, which further stabilizes the resulting tests and reduces the dependency on XPaths.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Overview

In accordance with various implementations, methods and apparatus, including computer program products, are provided which enable interpretation of UI elements as objects at compile time of a web application, and generation of bots based on compile time heuristics. The bots, i.e., test utility classes, can then be used in tests of the UI that simulate user actions on the UI. This avoids the need to manually rewrite the bot code when changes are made to the UI and thus reduces or eliminates the high maintenance costs for the bot code. Furthermore, it enables code sharing across software teams. Various implementations will be described in further detail below by way of example and with reference to a web application UI written in Java™ in GWT (Google Web Toolkit) using UiBinder templates. GWT is a development toolkit for building and optimizing complex web browser-based applications, and is provided by Google Inc. of Mountain View, Calif. It should however be realized that this is only one possible implementation and that the underlying ideas of the various implementations described herein are also applicable to many other programming languages and templates where the source code is written in Java™ and access is provided to the compiler. UiBinder templates are XML representations of the web application UI. As will be discussed in detail below, a hook in the compiler is used to access the XML representation and to generate bots that can be used to test the web application. The XML representation provides information about the appearance of the UI, and the bot generator framework in accordance with the various implementations, uses these heuristics.

Figure 1:
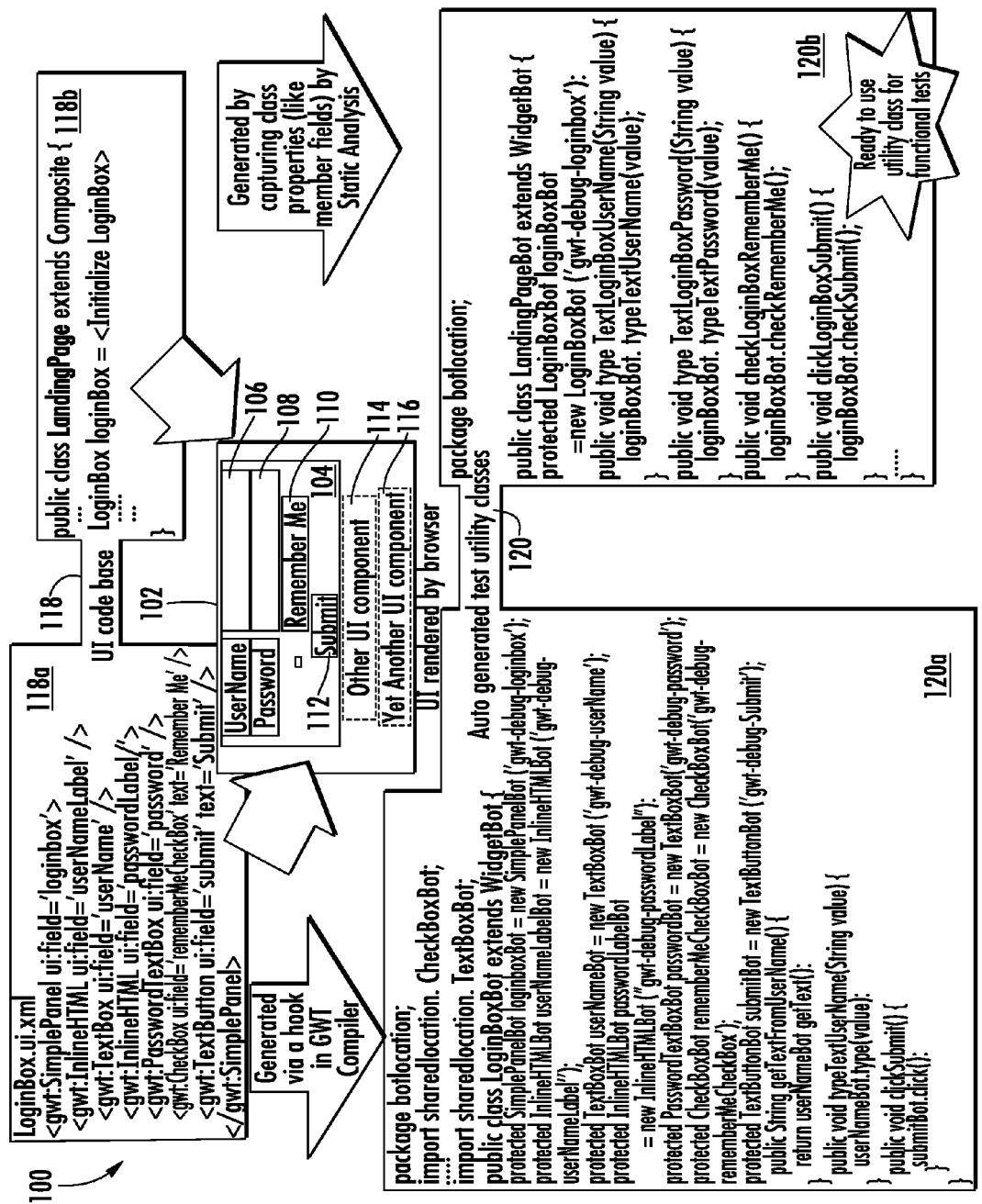
FIG. 1 shows a schematic diagram (100) of how test utility classes can be generated automatically, in accordance with one implementation.

FIG. 1 shows schematic overview (100) of how bots can be automatically generated in accordance with one implementation. As can be seen in FIG. 1, a simple UI (102) includes a login box (104) for a web application. The login box includes a username field (106) and a password field (108) in which a user can enter her username and password, respectively. The login box (104) further includes a "remember me" button (110), which the user can click on to save her username and password locally on the computer, and a "submit" button (112), which the user can click on to submit the entered username and password to log in to the web application. The illustrated UI (102) can also include other UI elements (114; 116), which will not be discussed in any detail herein.

The UI (102) is generated from a UI code base (118) written in the Java™ programming language using GWT, which contains programming instructions for generating and rendering the login box (104) and its elements, as well as instructions for generating and rendering the other UI elements (114; 116). The UI code base (118) includes a UiBinder template for the UI (102). In FIG. 1 LoginBox.ui.xml (118a) is the UiBinder template for the login box (104). The right hand side of the UI code base (118) shows a Java™ Class, LandingPage (118b), which holds a LoginBox object (104).

To test the UI (102) of the login page, bots (i.e., test utility classes) are generated as the source code (118) is compiled. Tests can then be written, which invoke the APIs of the generated bots to perform actions that a user would typically perform on the UI (102) of the login page, that is, entering a username in the username field (106), entering a password in the password field (108), and clicking the submit button (112). In a conventional testing environment, the bots are written by programmers, typically using a third-party tool, which requires the absolute XPath of each UI element and specifically asks for an action to be performed with respect to the UI element. Alternatively, a unique ID attribute can be associated with each UI element, and the ID attribute can be used when specifying actions to be performed by the bots with respect to the UI element. One example of such a third-party tool is Selenium, which is a joint development project by a number of independent programmers and can be obtained from <http://seleniumhq.org>. A manually written LoginPageBot that uses Selenium can for example look like:

LoginPageBot {
public void typeName(String name) {
seleniumObject.type(XPATH_OF_NAME_TEXT_FIELD, name);
}
public void typePassword(String password) {
seleniumObject.type(XPATH_OF_PASSWORD_TEXT_FIELD, password);
}
public void login( ){
seleniumObject.click(XPATH_OF_LOGIN_BUTTON);
}
}

In accordance with the various implementations described herein, no such manual programming of bots is needed. Instead, information that can be extracted from the source code (118) for the UI (102) of the login page at the time the login page is being compiled is used to automatically generate bots that are capable of performing the operations needed in testing the UI (102). In one implementation, the object tree representing the UI (102) of the login page is accessed from within the compiler during compilation, and an ID attribute is added to each of the HTML elements of the UI (102). As will be seen below, these ID attributes can be used to further stabilize the tests of the UI (102) and to reduce the bots' dependencies on XPaths.

Furthermore, the compiler in accordance with one implementation does not only compile the source code for the UI (102), but also invokes a bot generator framework (200) during compilation, which will be described in further detail below with reference to FIG. 2. The bot generator framework (200) generates a set of test utility classes (i.e., bots) (120) using one or more libraries (214) for basic UI element bots. These test utility classes (120) can then be used in automated tests of the UI (102) of the web application, as described above. In one implementation, one bot (120) is generated for each UiBInder template and additional bots are generated for each holder class. Thus, in FIG. 1, for example, the UI (102) for the login box (104) includes a UiBinder template LoginBox.ui.xml (118a), and a holder class LandingPage (118b). Hence, a LoginBoxBot (120a) and a LandingPageBot (120b) are generated. A subsequent test can then invoke either of these bots (120a, 120b). The container-bot automatically exposes the APIs (i.e., actions) which can be performed on the bot which it holds, i.e., the LandingPageBot (120b) automatically exposes the APIs which LoginBoxBot (120a) exposes.

These automatically generated bots (120a, 120b) can then be collected into one or more libraries (214) of basic UI element bots, which contain bots for various basic UI elements. The libraries of basic UI element bots (214) can be shared across teams and/or projects, for example, by extending third-party tools such as Selenium to include the new basic UI element bot libraries. For example, there may be a FlowPanelBot for a FlowPanel, a ButtonBot for a Button, a TextBoxBot for a TextBox, and so on. A complete list of GWT basic UI elements, for which bots (120) can be generated, can be found at:
<http://google-web-toolkit.googlecode.com/svn/javadoc/1.5/com/google/gwt/user/client/ui/package-summary.html>

Figure 2:
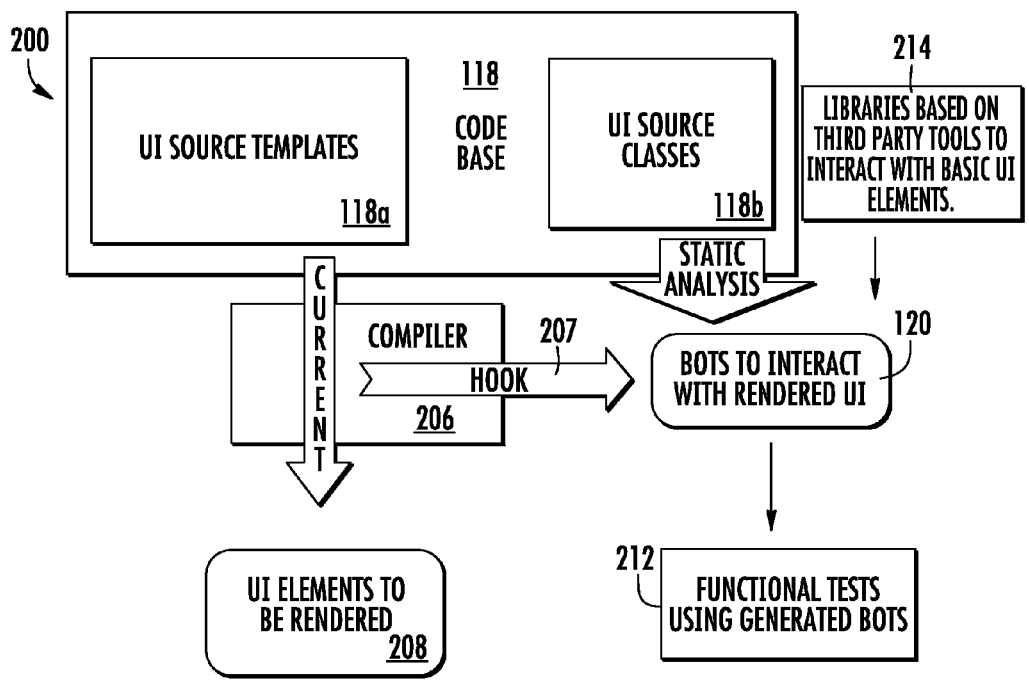
FIG. 2 shows a schematic diagram of a framework (200) for automatically generating test utility classes, in accordance with one implementation.

FIG. 2 shows an overview of a code generation framework (200) for an object oriented UI (102) in accordance with one implementation. As can be seen in FIG. 2, the code generation framework (200) includes the UI code base (118) described above, which itself includes UI Source templates (118a), such as the LoginBox.ui.xml shown in FIG. 1, and UI Source Classes (118b), such as the LandingPage class shown in FIG. 1. The code base (118) is compiled by a compiler (206) to render the UI elements (208) on the UI (102). In one implementation, the compiler (206) can be implemented by patching a conventional GWT compiler, so that the compiler (206) further includes a hook (207) to a bot generator and functionality for assigning a unique ID attribute to each UI element in the object tree representing the UI elements.

During the compilation, the compiler (206) adds a unique ID attribute to each UI element in the object tree and passes the object tree representing the UI elements to a bot generator using a hook (207) in the compiler. In one implementation, the UI elements have ID attributes of the following format: If the object tree is such that a container c1 contains a container c2 which contains UI element e, then the ID attribute for that UI element would be "C1-C2-E". Of course, this is merely one way to represent ID attributes, and as the skilled person realizes, many variations are possible. The bot generator takes the UI object tree and generates bots (120) to interact with the rendered UI (102) during the subsequent testing phase. By having a unique ID attribute for each UI element in the rendered UI (102), it is possible for the generated bots to use this ID attribute to uniquely identify the respective UI elements. The programmer who writes the web application test that uses the various bots, on the other hand, does not have to worry or care about the various UI elements' specific XPaths, as is necessary in today's third party tools.

In one implementation, the bots (120) are generated using a set of libraries (214), such as the ones described above, which contain basic bots for basic UI elements. Every basic UI element has a specific way in which it is rendered in a browser. For example, a FlexTable is rendered as a 'table' and its children are rendered as 'tr' in the final HTML code. Thus, a basic bot, FlexTableBot, knows that the FlexTable's children can be uniquely identified as:
//table[@id='table's id']/tr[0] or tr[1].

This is one example illustrating how having knowledge of the internal rendering of a basic UI element can be used to predict a relative XPath of child UI elements. This is especially useful in situations where the child elements are dynamically rendered in the final HTML representation at runtime and do not have defined variables in the UI source code. For example, a FlexTable might represent a table that displays some search results. At compile time, the results are not even defined, and hence any generated bots do not know about possible children, but through the FlexTableBot, there can be an exposed method, clickChild(int index), which ultimately clicks the //div[@id='table's id']/tr[index] element. Thus, these basic bots in the libraries (214) "know" the relative XPath rendering of each basic UI element, and the basic UI element bot libraries (214) need to be updated only when the HTML rendering of any basic UI element changes.

As an example, consider that during the compilation, the compiler (206) discovers that there is a login box (104), which includes a username field (106), a password field (108) and a submit button (112). The compiler (206) passes the object tree for these UI elements to the bot generator. The bot generator analyzes the UI object tree bottom up from the leaves, which each represent a basic UI element. The relative locations of the UI elements on the login page (102) are determined by the UI object tree. This tree hierarchy is used not only in generating the multiple bots, as described above, but also in automatically computing the UI elements' respective relative XPaths in the actual HTML rendered. The automatic computation of the relative XPaths, in combination with the added ID attributes for all the UI elements, as described above, stabilizes the bots and reduces the XPath maintenance cost. Each time UI source code changes, the tree hierarchy, XPaths and automatically generated ID attributes will change and updated bots will be automatically generated, as described above.

Now extending these ideas to the UI (102) of the entire login page, the actions that can be performed on the class LandingPage (118b), i.e., the login page, is the aggregate of all the actions that can be performed on the individual UI elements held by the LandingPage class (118b). For simplicity, only the UI elements in the login box (104) will be discussed here. To find out what UI elements are included in the LandingPage and subsequently generate the appropriate bots, a static analysis is performed of the Java™ Code base (118). That is, the Java™ code is parsed but not run. The static analysis captures class properties for the LandingPage class (118b), such as member fields, which allows the bot generator to use the UI element bot libraries (214) and automatically generate the appropriate bots (120) that can interact with the LandingPage, to perform the required testing of the login box (104).

The actual tests of the web application are then performed by writing functional tests (212) which use the generated bots to perform actions and verify the response of the web application. One example of such a test, written in Java™, is illustrated below:
TestActualLoginTest {
  doLogin( ){
    LandingPageBot landingPage=new LandingPageBot( );
    landingPage.typeTextLoginBoxUserName
      ("user@domain.com");
    landingPage.typeTextLoginBoxPassword("mypassword");
    landingPage.clickLoginBoxSubmit( );
    //verify the next page with a different bot, for example, an
      InboxPageBot for an Inbox page.
  }
}

The bot generator framework (200) also handles references to other templates within a template. For example, if a UiBinder template A, contains a reference to a UiBinder template B, then a bot "ABot" will have methods to perform actions on UI element B using generated methods in a "BBot" class. ABot is abstracted from the internal structure of UiBinder template B. All that ABot bot knows about UiBinder template B (or rendered UI element B) is the user level methods that can be simulated on UI element B using the generated BBot.

Figure 3:
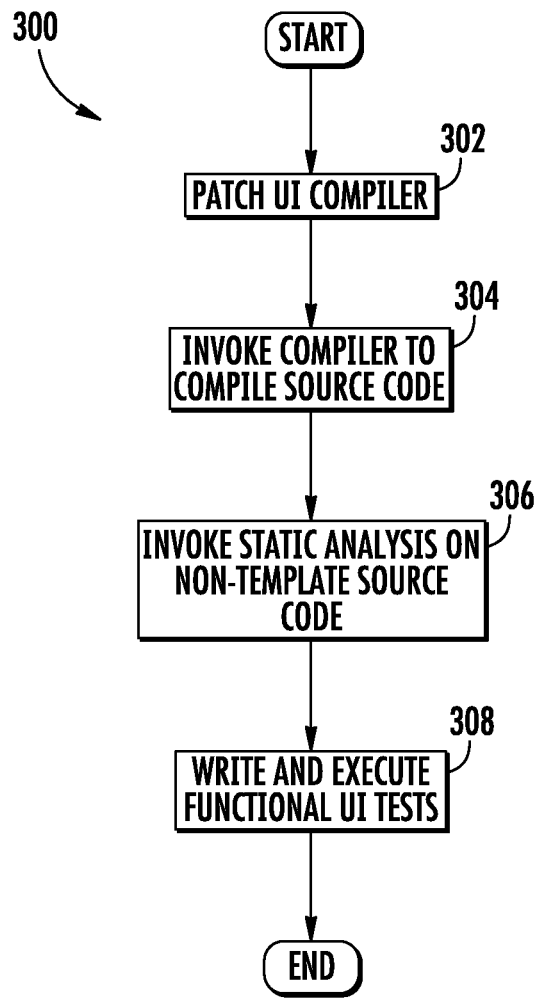
FIG. 3 shows a flowchart of a process (300) for automatically generating test utility classes and how the automatically generated test utility classes are used in actual tests, in accordance with one implementation.

In order to further improve the understanding of the various implementations, a schematic flowchart of a process (300) for generating and using bots is shown in FIG. 3. As was described above, it is assumed that one or more basic UI element bot libraries (214) is available, which contains bots that know the internal XPath rendering of each UI element in the UI and can perform actions using computed relative XPaths throughout the UI object tree abstracting the invoker from the rendered XPath.

As can be seen in FIG. 3, the process (300) starts by patching the UI compiler (106) (step 302). In one implementation, this can be done by adding a hooked call to the bot generator which is invoked for each UiBinder template. Next, the compiler (206) is invoked to compile the source code (118) and to add ID attributes to the UI elements in the object tree (step 304). Next, static analysis on the non-template-based source code is invoked (step 306). Both of these steps have been described in detail above.

The compilation and static analysis result in bots (120) being generated, which can interact with the rendered UI (102). Finally, functional UI tests (212) are written and executed (step 308), which completes the process (300). The functional tests use the methods in the generated bots to simulate real user actions, and are abstracted from the XPath details and third-party tools. In the event that the UI source code were to change, steps 304 and 306 can be invoked anew, which causes updated bots to be generated. Thus, as a result, no manual maintenance is needed.

Finally, to illustrate some of the benefits with the various implementations described herein, and why it is beneficial to generate higher-level bots based on the bots in the basic UI element bot libraries (214), please consider the following example. Assume there is a basic UI element bot library (214) that includes ButtonBot, TextFieldBot, and CheckBoxBot classes. Further, assume a UI which has a button, a checkbox, and a text field. In order to write a web application test of the UI in terms of basic bots, then it would be necessary to know manually that the UI contains these three elements, to name the various elements, and to manually look up the XPath and/or ID attribute from the browser for each UI element, as the basic UI element bots in the libraries (214) are generic. A basic, manually coded web application test may look like:

```
testWithBasicBots( ){
  TextBoxBot textBoxBot//initialize with manually looked up XPath/id
  ButtonBot buttonBot//initialize with manually looked up XPath/id
  CheckBoxBot checkBoxBot//initialize with manually looked up XPath/id
  textBoxBot.type(" ... ");
  checkBoxBot.select( )
  buttonBot.click( );
}
```

Now, consider a case where a high-level MyUIBot has been generated, which already exposes the following methods: clickSubmitButton ( ), typeName (String_name), and checkRememberMe ( ). In this case, the manually coded web application test would look like:

```
testWithGeneratedBot ( ){
  MyUIBot myUIBot//initialize
  myUIBot.typeName("somefirstname")
  myUIBot.checkRememberMe( )
  myUIBot.clickSubmit( )
}
```

At this point, it ought to be clear that using the generated higher level bots, such as MyUIBot, creates a significant reduction in programming efforts due to their level of abstraction, compared to if web application tests were written using basic UI element bots straight from the libraries (214).

Various implementations can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various implementations can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various implementations can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network. The above-described devices and materials will be familiar to those of skill in the computer hardware and software arts.

It should be noted that the various implementations employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. For example, even though the above implementations have been described with respect to web applications written in GWT, which use UiBinder templates and generate bots based on basic bot libraries, the above concepts can be used in a wide range of situations. For example, these techniques can be implemented on any type of UI, such as a desktop client UI and user action simulation tools, such as WebDriver. Accordingly, other implementations are within the scope of the following claims

The invention claimed is:

1. A computer-implemented method for generating one or more test utility classes for use in testing a user interface of a web application, comprising:
   providing source code for the web application user interface, the source code including one or more user interface elements;
   compiling the source code to generate user interface elements to be rendered on the user interface, wherein compiling further includes invoking a test utility class generator framework and passing a user interface object tree that includes the one or more user interface elements to the test utility class generator framework;

analyzing, by the test utility class framework, the user interface object tree to identify a set of basic user interface elements on the rendered user interface and to compute an extensible markup language path for each user interface element in the hypertext markup language rendered for the user interface; and generating, based on the analysis, one or more test utility classes for use in testing the rendered user interface.

2. The method of claim 1, further comprising:
using the generated test utility classes in one or more functional tests of the rendered user interface.

3. The method of claim 1, wherein the source code includes user interface source templates and user interface source classes.

4. The method of claim 3, wherein compiling the source code includes compiling the user interface source templates, and further comprising:
performing a static analysis of the user interface source classes to capture class properties of the user interface source classes.

5. The method of claim 4, wherein the class properties include member fields with associated type-information.

6. The method of claim 1, wherein generating one or more test utility classes includes using shared test utility classes from one or more libraries of basic test utility classes to construct the one or more test utility classes for use in testing the rendered user interface.

7. The method of claim 6, wherein the test utility classes in the libraries of basic test utility classes contain information about a relative extensible markup language path rendering of each user interface element in the rendered user interface.

8. The method of claim 1, wherein the web application user interface code is written in the JAVA™ programming language.

9. The method of claim 1, wherein compiling further includes:
adding an identifier attribute to each user interface element to be rendered on the user interface.

10. The method of claim 1, further comprising:
computing, by the test utility class framework, relative extensible markup language paths for the one or more user interface elements in the user interface object tree.

11. A computer program product, stored on a non-transitory machine-readable storage medium, for generating one or more test utility classes for use in testing a user interface of a web application, comprising instructions operable to cause a computer to:
provide source code for the web application user interface, the source code including one or more user interface elements;

compile the source code to generate user interface elements to be rendered on the user interface, wherein compiling further includes invoking a test utility class generator framework and passing a user interface object tree that includes the one or more user interface elements to the test utility class generator framework;

analyze, by the test utility class framework, the user interface object tree to identify a set of basic user interface elements on the rendered user interface and to compute an extensible markup language path for each user interface element in the hypertext markup language rendered for the user interface; and generate, based on the analysis, one or more test utility classes for use in testing the rendered user interface.

12. The computer program product of claim 11, further comprising instructions to:
use the generated test utility classes in one or more functional tests of the rendered user interface.

13. The computer program product of claim 11, wherein the source code includes user interface source templates and user interface source classes.

14. The computer program product of claim 13, wherein the instructions to compile the source code include instructions to compile the user interface source templates, and further comprising instructions to:
perform a static analysis of the user interface source classes to capture class properties of the user interface source classes.

15. The computer program product of claim 14, wherein the class properties include member fields with associated type-information.

16. The computer program product of claim 11, wherein the instructions to generate one or more test utility classes includes using shared test utility classes from one or more libraries of basic test utility classes to construct the one or more test utility classes for use in testing the rendered user interface.

17. The computer program product of claim 16, wherein the test utility classes in the libraries of basic test utility classes contain information about a relative extensible markup language path rendering of each user interface element in the rendered user interface.

18. The computer program product of claim 11, wherein the web application user interface code is written in the JAVA™ programming language.

19. The computer program product of claim 11, wherein the instructions to compile further include instructions to:
add an identifier attribute to each user interface element to be rendered on the user interface.

20. The computer program product of claim 11, further comprising instructions to:
compute, by the test utility class framework, relative extensible markup language paths for the one or more user interface elements in the user interface object tree.

* * * * *